United States Patent
Peerlings et al.

(10) Patent No.: US 8,697,830 B2
(45) Date of Patent: Apr. 15, 2014

(54) ALIPHATIC, SINTERABLE, THERMOPLASTIC POLYURETHANE MOLDING COMPOSITIONS WITH IMPROVED BLOOMING BEHAVIOR

(75) Inventors: Henricus Peerlings, Solingen (DE); Wolfgang Kaufhold, Köln (DE); Hartmut Nefzger, Pulheim (DE); Erika Bauer, Jüchen (DE); Markus Broich, Hückelhoven (DE)

(73) Assignee: Bayer MaterialScience AG, Leverkusen (DE)

( * ) Notice: Subject to any disclaimer, the term of this patent is extended or adjusted under 35 U.S.C. 154(b) by 1058 days.

(21) Appl. No.: 11/800,117

(22) Filed: May 4, 2007

(65) Prior Publication Data
US 2007/0265413 A1 Nov. 15, 2007

(30) Foreign Application Priority Data
May 9, 2006 (DE) .......................... 10 2006 021 734

(51) Int. Cl.
*C08G 18/00* (2006.01)

(52) U.S. Cl.
USPC .................. 528/83; 528/67; 528/76; 528/80; 528/84; 528/85

(58) Field of Classification Search
USPC .................. 528/44, 67, 76, 80, 83, 84, 85
See application file for complete search history.

(56) References Cited

U.S. PATENT DOCUMENTS

| | | | | |
|---|---|---|---|---|
| 4,540,771 | A * | 9/1985 | Ambrose et al. | 528/272 |
| 4,822,827 | A | 4/1989 | Bonk et al. | 521/170 |
| 6,559,266 | B2 * | 5/2003 | Kaufhold et al. | 528/76 |
| 6,586,553 | B1 | 7/2003 | Mühlfeld et al. | 528/76 |
| 6,596,820 | B2 * | 7/2003 | Muller et al. | 525/458 |
| 6,632,866 | B2 | 10/2003 | Kaufhold et al. | 524/394 |
| 6,706,807 | B2 | 3/2004 | Kaufhold et al. | 524/590 |
| 2001/0044516 | A1 | 11/2001 | Kaufhold et al. | 528/65 |
| 2003/0013792 | A1 | 1/2003 | Muhlfeld et al. | 524/394 |
| 2003/0060574 | A1 | 3/2003 | Muller et al. | 525/457 |
| 2003/0083416 | A1 | 5/2003 | Kaufhold et al. | 524/396 |
| 2003/0166794 | A1 | 9/2003 | Muehlfeld et al. | 525/453 |
| 2006/0142531 | A1 * | 6/2006 | Peerlings et al. | 528/44 |

FOREIGN PATENT DOCUMENTS

| | | |
|---|---|---|
| DE | 1 964 834 | 7/1971 |
| DE | 100 37 622 | 3/2001 |
| GB | 1057018 | 2/1967 |
| WO | 2005/089778 A1 | 9/2005 |

\* cited by examiner

*Primary Examiner* — Michael L Leonard
(74) *Attorney, Agent, or Firm* — Robert S. Klemz

(57) ABSTRACT

Light-stable, sinterable, thermoplastic polyurethanes with improved blooming behavior and good thermal stability as well as good technical processability are produced from an aliphatic diisocyanate using one or more chain extenders corresponding to a specified formula. These polyurethanes are particularly useful in the production of molded articles, particularly molded articles for automotive interiors.

3 Claims, No Drawings

ALIPHATIC, SINTERABLE, THERMOPLASTIC POLYURETHANE MOLDING COMPOSITIONS WITH IMPROVED BLOOMING BEHAVIOR

BACKGROUND OF THE INVENTION

The present invention relates to aliphatic, light-stable, sinterable, thermoplastic polyurethane molding compositions with improved blooming behavior, good thermal stability and good technical processability.

Thermoplastic polyurethanes (TPU) are of great technical importance because of their good elastomer properties and thermoplastic processability. An overview of the production, properties and uses of TPU's is given, for example, in Kuntstoff Handbuch [G. Becker, D. Braun], Vol. 7, "Polyurethane", Munich, Vienna, Carl Hanser Verlag, 1983.

TPU's are in most cases built up from linear polyols (macrodiols), such as polyester, polyether or polycarbonate diols, organic diisocyanates and short-chain, for the most part dihydric alcohols (chain extenders). They may be produced continuously or batch-wise. The best known production processes are the belt process (GB-A 1 057 018) and the extruder process (DE-A 19 64 834).

The synthesis of the thermoplastically processable polyurethane elastomers may be carried out either stepwise (prepolymer metering process) or by the simultaneous reaction of all components in one stage (one-shot metering process).

In the production of aliphatic thermoplastic polyurethanes based on 1,6-hexamethylene diisocyanate (HDI), cyclic oligourethanes are formed. Due to the specific crystallization process of these cyclic oligourethanes, they are less compatible with the polymer matrix and therefore lead to the formation of a chalky interfering surface coating. This phenomenon is described, for example, in DE-A 102 06 839. It has been shown that test storage at room temperature (100 days) or 28 days at 60° C. in an environment saturated with water vapor cannot provide a sufficiently accurate prediction of the long-term behavior. For this reason, accelerated water storage tests are also carried out in order to be able to estimate better the blooming behavior over a longer time period.

In principle, the consistency and thus also the blooming behavior of the cyclo-oligourethanes can be altered either by changing the diisocyanate and/or adapting the chain extender. Because of the good thermal stability, the mechanical properties and the good stabilization behavior, HDI is however particularly suitable as diisocyanate component for the production of TPU parts in automobile interiors (e.g., as instrument panel surfaces or other surfaces), so that a change of the diisocyanate is virtually out of the question. On the other hand, the chain extenders have been adapted with regard to the aforementioned requirements.

The use of 1,6-hexanediol, 1,5-pentanediol, 1,4-cyclohexanediol, 1,4-bis(hydroxymethyl)cyclohexane and of bis(hydroxyethyl)hydroquinone to improve the blooming behavior is described in DE-A 100 50 495.

The use of ethylene glycol, 1,4-bis(hydroxymethyl)benzene, 1,4-bis(hydroxyethyl)benzene and 1,4-bis(2-hydroxyethoxy)benzene to avoid the formation of a surface deposit is described in DE-A 100 37622.

The aforementioned TPU's, however, exhibit an undesirable blooming behavior after a fairly long period, which is undesirable especially if the TPU's are employed in automobile interiors.

SUMMARY OF THE INVENTION

The object of the present invention was therefore to make available thermoplastic, sinterable, light-stable polyurethane molding compositions (TPU's), which manifest no blooming behavior even after a long period (as tested by an accelerated water storage test), and do not exhibit any surface deposit, and furthermore have a good thermal stability, pleasant feel and good technical processability.

This object was achieved by the use of special oligomeric chain extenders, alone or in combination with other chain extenders.

DETAILED DESCRIPTION OF THE INVENTION

The present invention accordingly provides light-stable, sinterable, thermoplastic polyurethanes obtainable from
a) an isocyanate component composed of
   a1) 70 to 100 mol. % of 1,6-hexamethylene diisocyanate and
   a2) 0 to 30 mol. % of an aliphatic diisocyanate other than 1,6-hexamethylenediisocyanate or a mixture of aliphatic and/or cycloaliphate diisocyanates which does not include 1,6-hexamethylene diisocyanate,
b) a chain extender component composed of
   b1) from 40 to 100 mol. % of at least one chain extender having a number average molecular weight between 104 and 500 g/mol represented by either formula (I) or formula (II)

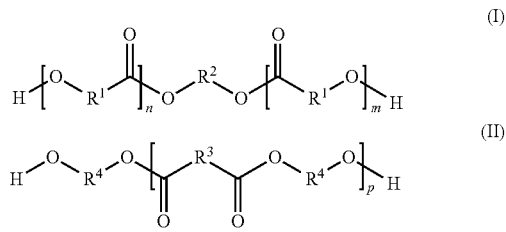

in which
   $R^1$ represents a branched or unbranched alkylene radical with from 1 to 12 C atoms or a substituted or unsubstituted alkarylene radical with from 6 to 24 C atoms,
   $R^2$, $R^4$ each represents a branched or unbranched alkylene radical or alkoxyalkylene radical with from 1 to 12 C atoms or a substituted or unsubstituted alkarylene radical with from 6 to 24 C atoms or a substituted or unsubstituted alkoxyarylene radical with from 6 to 24 C atoms,
   $R^3$ represents a branched or unbranched alkylene radical with from 1 to 8 C atoms or a substituted or unsubstituted alkarylene radical with from 6 to 20 C atoms or a substituted or unsubstituted arylene radical with from 6 to 20 C atoms or a substituted or unsubstituted aralkylene radical with from 6 to 20 C atoms,
   n, m each represents 0 to 10, where n+m≥1, and
   p represents 1 to 10,
   b2) from 0 to 60 mol. % of a chain extender or a mixture of chain extenders with a number average molecular weight of from 60 to 400 g/mol which is different from chain extender b1), and
c) at least one polyol component, preferably selected from the group of polyethers and/or polyesters and/or polycarbonate diols, with a number average molecular weight of from 450 to 6000 g/mol,
   in the presence of
d) optionally, one or more catalysts,
   with the addition of e) from 0.1 to 5 wt. %, based on the weight of the thermoplastic polyurethane, of one or more light stabilizers.

f) optionally, further additives and/or auxiliary substances and g) optionally, one or more chain terminators, in which the ratio of the isocyanate groups from a) to the isocyanate-reactive groups from b), c) and g) is from 0.9:1 to 1.1:1.

Suitable organic diisocyanates a2) include the following aliphatic and/or cycloaliphatic diisocyanates: ethylene diisocyanate, 1,4-tetramethylene diisocyanate, 1,12-dodecane diisocyanate; cycloaliphatic diisocyanates such as isophorone diisocyanate, 1,4-cyclohexane diisocyante, 1-methyl-2, 4-cyclohexande diisocyanate and 1-methyl-2,6-cyclohexande diisocyanate as well as the corresponding isomer mixtures, 4,4'-dicyclohexylmethane diisocyanate, 2,4'-dicyclohexylmethane diisocyanate and 2,2'-dicyclohexylmethane diisocyanate, as well as the corresponding isomer mixtures. 1,4-Cyclohexane diisocyanate, isophorone diisocyanate and dicyclohexylmethane diisocyanate are preferably used. The aforementioned diisocyanates may be used individually or in the form of mixtures with one another. They may also be used together with up to 15 mol. % (calculated on the total mols of diisocyanate) of a polyisocyanate, though the maximum amount of polyisocyanate that may be added is such that a thermoplastically processable product is still formed.

Chain extenders b2) have on average from 1.8 to 3.0 Zerewitinoff-active hydrogen atoms and a molecular weight of from 60 to 400. The chain extenders may contain hydroxyl groups, amino groups, thiol groups or carboxyl groups, preferably two to three hydroxyl groups, most preferably, two hydroxyl groups.

As chain extender b2), it is preferred that one or more compounds which does/do not correspond to the chain extender b1) be used. Preferred chain extenders b2) are preferably chosen from the group comprising aliphatic diols with 2 to 14 carbon atoms, such as ethanediol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane and neopentyl glycol. Also suitable are hydroxyalkylene ethers of hydroquinone, e.g., 1,4-di(β-hydroxyethyl)-hydroquinone; ethoxylated bisphenols, e.g., 1,4-di(β-hydroxyethyl)bisphenol A; (cyclo)aliphatic diamines such as isophoronediamine, ethylenediamine, 1,2-propylenediamine, 1,3-propylenediamine, N-methylpropylene-1,3-diamine, and N,N'-dimethylethylenediamine; and aromatic diamines such as 2,4-toluenediamine, 2,6-toluenediamine, 3,5-diethyl-2,4-toluenediamine or 3,5-diethyl-2,6-toluenediamine; or primary mono- di-, tri- or tetra-alkyl-substituted 4,4'-diaminodiphenylmethanes. Ethanediol, 1,4-butanediol, 1,6-hexanediol, 1,4-di(β-hydroxyethyl)hydroquinone and/or 1,4-di (β-hydroxyethyl)bisphenol A are most preferably used as chain extenders. In addition, smaller amounts of trihydric alcohols may also be added.

As polyol components c), those compounds with on average at least 1.8 to at most 3.0 Zerewitinoff-active hydrogen atoms and with a number average molecular weight $M_n$ of 450 to 6000 are preferably used. Compounds containing hydroxyl groups as well as compounds containing amino groups, thiol groups or carboxyl groups, in particular compounds containing two to three, preferably two hydroxyl groups, specifically those with number average molecular weights $M_n$ of from 600 to 4500 are preferred. Depending on the production conditions, these polyols often contain small amounts of non-linear compounds, therefore these polyols are frequently described as "substantially linear polyols". Polyester, polyether, and polycarbonate diols or mixtures thereof are particularly preferred.

Suitable polyether diols can be prepared by reacting one or more alkylene oxides with 2 to 4 carbon atoms in the alkylene radical with a starter molecule that contains two active hydrogen atoms in bound form. Examples of suitable alkylene oxides include: ethylene oxide, 1,2-propylene oxide, epichlorohydrin, 1,2-butylene oxide and 2,3-butylene oxide. Ethylene oxide, propylene oxide and mixtures of 1,2-propylene oxide and ethylene oxide are preferably used. The alkylene oxides may be used individually, alternatingly, or as mixtures. Examples of suitable starter molecules include: water, amino alcohols such as N-alkyl-diethanolamines, for example N-methyl-diethanolamine, and diols such as ethylene glycol, 1,3-propylene glycol, 1,4-butanediol and 1,6-hexanediol. Also, mixtures of starter molecules may optionally be used. Suitable polyetherols include the hydroxyl group-containing polymerization products of tetrahydrofuran. Trifunctional polyethers may also be employed in amounts of from 0 to 30 wt. %, based on the weight of the bifunctional polyethers, but at most in an amount such that a thermoplastically processable product is still formed. The substantially linear polyether diols preferably have a number average molecular weights $M_n$ of from 450 to 6000. They may be used individually as well as in the form of mixtures with one another. The polyether diols prepared from epoxides may be obtained by the double metal cyamide-catalyzed method as well as by the KOH-catalyzed method.

Suitable polyester diols may be prepared, for example, from dicarboxylic acids with 2 to 12 carbon atoms, preferably 4 to 6 carbon atoms, and polyhydric alcohols. Examples of suitable dicarboxylic acids include; aliphatic dicarboxylic acids such as succinic acid, glutaric acid, adipic acid, suberic acid, azelaic acid and sebaceous acid; and aromatic dicarboxylic acids such as phthalic acid, isophthalic acid and terephthalic acid. The dicarboxylic acids may be used individually or as mixtures, e.g., in the form of a succinic acid, glutaric acid and adipic acid mixture. For the preparation of the polyester diols it may possibly be advantageous to use, instead of the dicarboxylic acids, the corresponding dicarboxylic acid derivatives such as carboxylic acid diesters with 1 to 4 carbon atoms in the alcohol radical, carboxylic acid anhydrides or carboxylic acid chlorides. Examples of suitable polyhydric alcohols are glycols with from 2 to 10, preferably from 2 to 6 carbon atoms, for example ethylene glycol, diethylene glycol, 1,4-butanediol, 1,5-pentanediol, 1,6-hexanediol, 1,10-decanediol, 1,12-dodecanediol, 3-methyl-1,5-pentanediol, 3-methyl-1,3-propanediol, 1,2-propanediol, 2,2-dimethyl-1,3-propanediol, 1,3-propanediol and dipropylene glycol. Depending on the desired properties, the polyhydric alcohols may be used alone or as mixtures with one another. Also suitable are esters of carbonic acid with the aforementioned diols, in particular those with from 4 to 6 carbon atoms such as 1,4-butanediol or 1,6-hexanediol, condensation products of ω-hydroxycarboxylic acids such as ω-hydroxycaproic acid or polymerization products of lactones, e.g., optionally substituted ω-caprolactones. Preferred polyester diols include: ethanediol polyadipates, 1,4-butanediol polyadipates, ethanediol-1,4-butanediol polyadipates, 1,6-hexanediol-neopentyl glycol polyadipates, 1,6-hexanediol-1,4-butanediol polyadipates and polycaprolactones. The polyester diols have a number average molecular weight of from $M_n$ of 450 to 6000 and may be used individually or in the form of mixtures with one another.

The relative amounts of the Zerewitinoff-active compounds are preferably chosen so that the ratio of the sum of the isocyanate groups from a) to the sum of the Zerewitinoff-active hydrogen atoms from b)+c)+g) is from 0.9:1 to 1.1:1.

Further additives that may be incorporated into the TPU are thermoplastics, for example, polycarbonates and acrylonitrile/butadiene/styrene terpolymers, in particular ABS. Other elastomers such as rubber, ethylene/vinyl acetate copolymers, styrene/butadiene copolymers as well as other TPU's may also be included.

Suitable catalysts d) include the conventional tertiary amines known in the prior art, such as triethylamine, dimethylcyclohexylamine, N-methylmorpholine, N,N'-dimethylpiperazine, 2-(dimethylamino-ethoxy)ethanol, diazabicyclo[2,2,2]octane and similar compounds, as well as organometallic compounds such as titanic acid esters, iron compounds, and tin compounds such as tin diacetate, tin dioctoate, tin dilaurate and the tin dialkyl salts of aliphatic carboxylic acids, such as dibutyl tin diacetate, dibutyl tin dilaurate and the like. Preferred catalysts are organometallic compounds, in particular titanic acid esters, iron, tin, zirconium and bismuth compounds. The total amount of catalyst used is generally from about 0 to 5 wt. %, preferably from 0 to 2 wt. %, based on the total amount of TPU.

The thermoplastic polyurethane elastomers of the present invention contain one or more light stabilizers e) and optionally auxiliary substances and additives f). Typical auxiliary substances and additives include: lubricants and mold release agents, such as fatty acid esters, their metal soaps, fatty acid amides, fatty acid ester amides and silicone compounds; antiblocking agents; plasticizers; inhibitors; stabilizers against hydrolysis, heat and discoloration; dyes; pigments; inorganic and/or organic fillers; fungistatic and bacteriostatic acting substances; fillers; and mixtures thereof.

Further details of the aforementioned light stabilizers and auxiliary substances and additives can be found, for example, in the monograph by J. H. Saunders and K. C. Frisch, "High Polymers", Vol. XVI, Polyurethane, Parts 1 and 2, Verlag Interscience Publishers 1962 and 1964, *The Handbook for Plastics Additives* by R. Gachter and H. Müller (Hanser Verlag Munich 1990) or from DE-A 29 01 774.

The addition of the light stabilizer(s) e) and auxiliary substances and additives f) may take place during the production process and/or during an additional compounding. In order to obtain a sinterable molding composition, the TPU is finely ground under the influence of liquid nitrogen. The sinterable product then has a mean particle size distribution of from 50 to 800 µm.

Monofunctional compounds g) reactive with respect to isocyanates may be used as so-called chain terminators in amounts of up to 2 wt. %, based on the weight of the TPU. Suitable chain terminating compounds include: monoamines such as butylamine and dibutylamine, octylamine, stearylamine, N-methylstearylamine, pyrrolidine, piperidine and cyclohexylamine; monohydric alcohols such as butanol, 2-ethylhexanol, octanol, dodecanol, stearyl alcohol, the various amyl alcohols, cyclohexanol and ethylene glycol monomethyl ether.

The thermoplastic polyurethanes of the present invention are useful for the production of thermostable, light-stable molded parts, these molded parts preferably being employed in automobile interiors.

The invention will now be described in more detail with the aid of the following examples.

The following abbreviations and acronyms are used hereinafter:

PE 225B Polyester diol with a molecular weight of $M_n$=2250 g/mol; product from the company Bayer MaterialScience AG.

POLYOL Polyether (C-3/C-2 mixed ether) with a molecular weight of $M_n$=2000 g/mol; a product which is commercially available from the company Bayer MaterialScience AG under the name Acclaim® 2220N.

HDI 1,6-hexamethylene diisocyanate
HDO 1,6-hexanediol
EG 1,2-ethanediol
PDO 1,5-pentanediol
CHDM 1,4-cyclohexanedimethanol
HQEE 1,4-bis-(2-hydroxyethoxy)benzene
ANTIOXIDANT Antioxidant which is commercially available from the company Ciba Specialty Chemicals Inc. under the name Irganox®V 1010.
STABILIZER 1 HALS stabilizer which is commercially available from the company Ciba Specialty Chemicals Inc. under the name Tinuvin® 622.
STABILIZER 2 Light stabilizer based on a benzotriazole which is commercially available from the company Ciba Specialty Chemicals Inc. under the name Tinuvin® 234.
Licowax C Mold release agent from the company Clariant GmbH
Elftex 435 Color black from the company Cabot Corp.
DBTL Dibutyltin dilaurate
Cap-HDO Chain extender of ϵ-caprolactone and 1,6-hexanediol
Ad-HDO Chain extender of adipic acid and 1,6-hexandediol
Cap-HQEE Chain extender of ϵ-caprolactone and 1,4-bis(2-hydroxy-ethoxy)benzene

EXAMPLES

Production of the Chain Extenders

Chain Extender of ϵ-Caprolactone and 1,6-Hexanediol (Cap-HDO):

2702 g (23.7 mol) of ϵ-caprolactone, 2797 g (23.7 mol) of 1,6-hexanediol and 110 mg of dibutyltin dilaurate (DBTL) were placed in a four-necked flask under nitrogen and slowly heated to 200° C. over 2 hours while stirring. After 20 hours, the refractive index of the melt was measured hourly. The reaction was complete after 23 hours. (The 22-hour and 23-hour refractive indices differed by less than 0.001).

The acid No. (0.1 mg KOH/g), the hydroxyl No. (481.6 mg KOH/g) and the viscosity (190 mPas (25° C.) were measured.

Chain Extender of ϵ-Caprolactone and HOEE (Cap-HQEE):

2702 g (23.7 mol) of ϵ-caprolactone, 4698 g (23.7 mol) of HQEE and 148 mg of dibutyltin dilaurate (DBTL) were placed in a four-necked flask under nitrogen and slowly heated to 200° C. over 2 hours while stirring. The reaction was complete after a reaction time of 20 hours. It was not possible to measure the refractive index on account of the melting point of ~80° C. The acid No. (0.2 mg KOH/g) and the hydroxyl No. (360.4 mg KOH/g) were measured.

Chain Extender of Adipic Acid and 1,6-Hexanediol (Ad-HDO):

7021 g of 1,6-hexanediol (59.5 mol), 1241 g (8.5 mol) of adipic acid and 100 mg of tin dichloride dihydrate were placed in a four-necked flask under nitrogen and slowly heated to 200° C. in 2 hours while stirring, water being split off. After 20 hours, the acid No. was 1.5 mg KOH/g. The reaction was terminated by applying a vacuum (300 mbar). The acid No. was 0.2 mg KOH/g. 2 kg of 1,6-hexanediol were distilled off within 90 minutes at 15 mbar and 180° C.

The product thereby obtained was then subjected to a short-path distillation at a jacket temperature of 200° C. and a vacuum of 0.2 mbar, the 1,6-hexanediol being largely removed. 2000 g of a non-crystallizing product which was liquid at room temperature was obtained, with an OH No. of 267.5 mg KOH/g, an acid No. of 0.1 mg KOH/g and a viscosity of 30 mPas (75° C.).

General Description of the Production of the TPU:

A mixture of PE225B, POLYOL and chain extender with 0.5% ANTIOXIDANT and 40 ppm DBTL (based on the polyol amount) was heated to 130° C. while stirring. Following this, HDI was added. The mixture was then stirred until the maximum possible increase in viscosity was obtained, and the TPU was poured off. The material was thermally post-treated for 30 minutes at 80° C. and then granulated. Specific details of the formulations and amounts are given in Table 1.

Extrusion:

STABILIZER 2, STABILIZER 1, Licowax C (in each case in an amount of 0.5 wt. %) and 2 wt. % of Elftex 435 were added to the TPU granular material produced according to the general description, and extruded in a DSE 25, 4 Z, 360 Nm type extruder of the following construction:

1. cold feed with conveyer elements,
2. first heating zone (165° C.) with $1^{st}$ kneading zone,
3. second heating zone (175° C.) with conveyer elements and second kneading zone,
4. third heating zone (180° C.) with kneading zone, conveyer elements and vacuum degassing,
5. crosshead (185° C.) and nozzle (180° C.), with a throughput of 10 kg/hour at a rotational speed of 220 rev/min and then processed with a strand granulator into granular material.

Cold Grinding:

The grinding of the compounded granular material was carried out in a CUM100 type mill from the company Netzsch-Condux at a grinding frequency of 21 000 rev/min. The granular material was cooled under the influence of liquid nitrogen and added uniformly to the mill. The powder was then dried in a drying cabinet (2 hours, 90° C.). The mean particle size distribution was from 50 to 800 µm.

Slushing:

The dried powder was added to a swivellable powder box. A pitted metal plate of nickel preheated to 240° C. was clamped on the powder box and swivelled a few times so that the powder was sintered onto the hot plate. The plate with the sintered-on TPU was then post-heated for one minute at 240° C. in an oven. The plate was cooled. The pitted TPU skin was removed from the plate.

Determination of the Thermal Stability:

The thermal stability was measured by storing the slushed skin in a circulating air drying cabinet at 110° C. (tolerance ±2° C.) over a period of 1000 hours. After the storage, the skin was qualitatively checked to determine whether the material exhibited any fusion (e.g., on the surface).

Determination of the Technical Processability:

The mold release behavior (removal of the skin from the plate and deformation of the skin during the mold removal process) was qualitatively evaluated.

DSC Measure:

DSC (differential scanning calorimetry) is an effective method for detecting and quantifying glass transition points and melting points as well as associated thermal capacities or transition enthalpies.

DSC thermograms were obtained by heating a small aluminum pan containing 5-30 mg of a sample (granular material or powder), and an empty small aluminum reference pan to constant weight. If temperature differences with respect to the reference pan occurred, for example, as a result of endothermic transitions in the sample, the small sample pan was heated further for a short time. This heat flow difference is the evaluable signal.

DSC is described in more detail, for example, in *Textbook of Polymer Science* by Fred W. Billmeyer, Jr., $3^{rd}$ Edition, published by Wiley-Interscience.

The DSC measurements described herein were carried out with a DSC 7 from the Perkin Elmer Company. For this purpose, 5-30 mg of granular material were added to the small sample pan, and the sample was cooled to −70° C. and held at this temperature for one minute. The sample was then heated at a heating rate of 20° C. per minute to 260° C. The melting point given hereinafter is in each case the maximum value of the occurring melting peak.

Determination of the Blooming Behavior:

In order to determine the blooming behavior, the slush skins were subjected to four test conditions. The skins were then investigated qualitatively for the formation of a surface deposit. The test conditions were as follows:

1. Storage at room temperature over a period of 4 weeks
2. Storage at 30° C. in distilled water over a period of 4 weeks
3. Storage at 40° C. in distilled water over a period of 4 weeks
4. Storage at 60° C. in a drying cabinet at a relative atmospheric humidity of 95% over a period of 4 weeks The results of the investigations are shown in Table 2.

In the comparison Examples 1 to 4, TPU's not according to the invention made with HDO, EG, CHDM or PDO as chain extender were used. Although the technical processability in Examples 1 and 2 and the thermal stability were sufficient, too much surface deposit was formed on the samples, especially in the water storage test (accelerated test for the blooming behavior in practice). In Examples 3 and 4, the processability was poor. The skins became deformed in the mold removal procedure.

The products from the Examples 5 to 8 produced in accordance with the invention satisfy all the requirements as regards processability, thermal stability and lack of formation of a surface deposit.

In comparison Example 9, the amount of Cap-HDO in the component b) was too low. This led to problems in the blooming behavior.

The products of the Examples 10-12 produced in accordance with the invention satisfactorily fulfilled all the requirements.

TABLE 1

| | | | | | | | | |
|---|---|---|---|---|---|---|---|---|
| | | | | | Formulations | | | |
| Example | | PE 225 [g] | POLYOL [g] | Chain extender | Amount [g] | Chain extender | Amount [g] | HDI [g] |
| 1 | Comparison | 368 | 160 | HDO | 68 | None | 0 | 134 |
| 2 | Comparison | 359 | 160 | EG | 37 | None | 0 | 134 |
| 3 | Comparison | 578 | 257 | CHDM | 271 | None | 0 | 373 |

TABLE 1-continued

Formulations

| Example | | PE 225 [g] | POLYOL [g] | Chain extender | Amount [g] | Chain extender | Amount [g] | HDI [g] |
|---|---|---|---|---|---|---|---|---|
| 4 | Comparison | 749 | 331 | PDO | 123 | None | 0 | 273 |
| 5 | Present invention | 473 | 202 | Cap-HDO | 442 | None | 0 | 364 |
| 6 | Present invention | 286 | 126 | Cap-HDO | 119(76%) | HDO | 18.8(24%) | 141 |
| 7 | Present invention | 296 | 131 | Cap-HDO | 92(60%) | HDO | 31(40%) | 140 |
| 8 | Present invention | 299 | 132 | Cap-HDO | 78(50%) | HDO | 39(50%) | 142 |
| 9 | Comparison | 338 | 149 | Cap-HDO | 35(29%) | HDO | 44(71%) | 123 |
| 10 | Present invention | 368 | 158 | Cap-HDO | 111(58%) | HQEE | 68(42%) | 175 |
| 11 | Present invention | 274 | 121 | Ad-HDO | 128(50%) | HDO | 36(50%) | 130 |
| 12 | Present invention | 290 | 122 | Cap-HQEE | 161 | None | 0 | 117 |
| 13 | Comparison | 349 | 150 | HDO | 52.5(80%) | BDO | 10.0(20%) | 132 |

The % amounts given in brackets are mol. % based on the total amount of chain extender b)

TABLE 2

Results

| Ex. | Type of Example | Thermal stability | Technical processability | Tm (DSC) [° C.] | Tc (DSC) [° C.] | Blooming RT | Blooming 30° C. in water | Blooming 40° C. in water | Blooming 60° C. with 95% atm. humidity |
|---|---|---|---|---|---|---|---|---|---|
| 1 | Comparison | Good | Good | 145 | 91 | No deposit | Much deposit | Much deposit | No deposit |
| 2 | Comparison | Good | Good | 129 | 75 | No deposit | Much deposit | Much deposit | No deposit |
| 3 | Comparison | Good | Poor | 163 | 89 | No deposit | Much deposit | Much deposit | No deposit |
| 4 | Comparison | Good | Poor | 131 | 80 | No deposit | Much deposit | Much deposit | No deposit |
| 5 | Present invention | Good | Good | 117 | 62 | No deposit | No deposit | No deposit | No deposit |
| 6 | Present invention | Good | Good | 124 | 74 | No deposit | No deposit | No deposit | No deposit |
| 7 | Present invention | Good | Good | 130 | 80 | No deposit | No deposit | No deposit | No deposit |
| 8 | Present invention | Good | Good | 135 | 85 | No deposit | No deposit | No deposit | No deposit |
| 9 | Comparison | Good | Good | 136 | 86 | No deposit | Much deposit | Much deposit | No deposit |
| 10 | Present invention | Good | Good | 155 | 85 | No deposit | No deposit | No deposit | No deposit |
| 11 | Present invention | Good | Good | 123 | 62 | No deposit | No deposit | No deposit | No deposit |
| 12 | Present invention | Good | Good | 161 | 93 | No deposit | No deposit | No deposit | No deposit |
| 13 | Comparison | Good | Good | 133 | 76 | No deposit | Much deposit | Much deposit | No deposit |

Tm (DSC): Melting point
Tc (DSC): Recrystallisation temperature

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A light-stable, sinterable, thermoplastic polyurethane comprising the reaction product of a) an isocyanate component comprising:

a1) from 70 to 100 mol. % of 1,6-hexamethylene diisocyanate and a2) from 0 to 30 mol. % of an aliphatic diisocyanate other than 1,6-hexamethylene diisocyanate or a mixture of aliphatic and/or cycloaliphate diisocyanates which does not include 1,6-hexamethylene diisocyanate, b) a chain extender component comprising:

b1) from 40 to 100 mol. % of at least one chain extender with a number average molecular weight between 104 and 500 g/mol corresponds to formula (I) or formula (II)

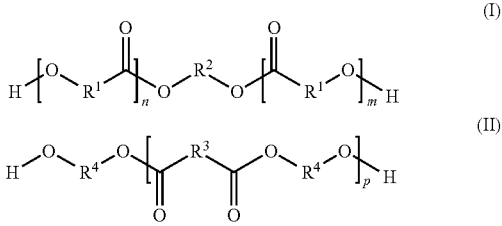

in which

R¹ represents a branched or unbranched alkylene radical with from 1 to 12 C atoms or an alkarylene radical with from 6 to 24 C atoms, R², R⁴ each represents a branched or unbranched alkylene radical with from 1 to 12 C atoms or an alkoxyalkylene radical with from 1 to 12 C atoms or an alkarylene radical with from 6 to 24 C atoms or an alkoxyarylene radical with from 6 to 24 C atoms, R³ represents a branched or unbranched alkylene radical with from 1 to 8 C atoms, n, m each represent 0 to 10, where n+m≥1, and p represents 1 to 10, b2) from 0 to 60 mol. % of a chain extender or a mixture of chain extenders having a number average molecular weight of from 60 to 400 g/mol which is different from the chain extender b1), and c) at least one polyol component with a number average molecular weight of 450 to 6000 g/mol, in the presence of d) optionally, one or more catalysts, with the addition of e) from 0.1 to 5 wt. %, based on weight of the thermoplastic polyurethane, of light stabilizers, f) optionally, further additives and/or auxiliary substances and g) optionally, one or more chain terminators, in which the ratio of the isocyanate groups of a) to isocyanate-reactive groups of b), c) and g) is from 0.9:1 to 1.1:1.

2. A thermally stable, light-stable molded article produced from the thermoplastic polyurethane of claim 1.

3. Automobile interior parts produced from the thermoplastic polyurethane of claim 1.

* * * * *